United States Patent
Nagar et al.

(10) Patent No.: US 11,709,553 B2
(45) Date of Patent: *Jul. 25, 2023

(54) AUTOMATED PREDICTION OF A LOCATION OF AN OBJECT USING MACHINE LEARNING

(71) Applicant: International Business Machines Corporation, Armonk, NY (US)

(72) Inventors: Raghuveer Prasad Nagar, Kota (IN); Kavita Prasad, Patna (IN); Mahasweta Ghosh, Hooghly (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/185,560

(22) Filed: Feb. 25, 2021

(65) Prior Publication Data

US 2022/0269349 A1   Aug. 25, 2022

(51) Int. Cl.
  *G06V 40/20* (2022.01)
  *G06F 3/01* (2006.01)
  (Continued)

(52) U.S. Cl.
  CPC ............. *G06F 3/017* (2013.01); *G06F 40/40* (2020.01); *G06N 3/08* (2013.01); *G06V 20/20* (2022.01); *G06V 40/20* (2022.01)

(58) Field of Classification Search
  CPC .......... G06F 3/017; G06F 40/40; G06F 40/20; G06F 3/012; G06F 3/013; G06N 3/08;
  (Continued)

(56) References Cited

U.S. PATENT DOCUMENTS 4,536,951 A    8/1985   Rhodes
5,693,568 A    12/1997  Liu
(Continued)

FOREIGN PATENT DOCUMENTS

EP    2427857 B1       9/2016
WO    2013039603 A1    3/2013
WO    2019036844 A1    2/2019

OTHER PUBLICATIONS

Marcos Auŕelio Domingues* and Maria da Graca Campos Pimentel, Exploiting Geo-Referenced Data as Contextual Information into Context-Aware Recommender Systems, IEEE (Year: 2017).*

(Continued)

*Primary Examiner* — Mohamed Abou El Seoud
(74) *Attorney, Agent, or Firm* — Peter Suchecki

(57) ABSTRACT

Provided is a method, computer program product, and system for predicting a location of an object using machine learning. A processor may monitor a data stream received from one or more observation devices. The processor may detect a gesture initiated by a user from the data stream, the gesture indicating that the user is searching for an object. The processor may identify the object by analyzing a set of contextual data associated with the user. The processor may predict, in response to identifying the object, a location of the object by analyzing historic data associated with the object from the data stream. The processor may output the predicted location of the object to the user.

15 Claims, 7 Drawing Sheets

(51) Int. Cl.
*G06N 3/08* (2023.01)
*G06F 40/40* (2020.01)
*G06V 20/20* (2022.01)

(58) Field of Classification Search
CPC ........ G06N 3/045; G06N 5/022; G06V 20/20; G06V 40/20; G06V 10/82
See application file for complete search history.

(56) References Cited

U.S. PATENT DOCUMENTS

| | | | |
|---|---|---|---|
| 6,611,453 | B2 | 8/2003 | Ning |
| 6,783,999 | B1 | 8/2004 | Lee |
| 7,551,076 | B2 | 6/2009 | Tyroler |
| 8,717,165 | B2 | 5/2014 | Gernandt et al. |
| 8,921,960 | B2 | 12/2014 | Yang |
| 9,225,772 | B2 | 12/2015 | Lui |
| 9,286,783 | B1 | 3/2016 | Teller |
| 9,595,670 | B1 | 3/2017 | Gee |
| 9,613,861 | B2 | 4/2017 | Anderson |
| 9,806,129 | B2 | 10/2017 | Ravasio |
| 9,979,809 | B2 | 5/2018 | Scavezze et al. |
| 10,013,654 | B1* | 7/2018 | Levy ................ G06N 3/0454 |
| 10,152,495 | B2 | 12/2018 | Rahman et al. |
| 10,319,908 | B2 | 6/2019 | Narayanan |
| 10,389,592 | B2 | 8/2019 | Lui |
| 11,487,767 | B2 | 11/2022 | Vannini |
| 2002/0155693 | A1 | 10/2002 | Hong et al. |
| 2008/0155422 | A1 | 6/2008 | Manico et al. |
| 2008/0264962 | A1* | 10/2008 | Schifman ............... G07F 11/62 221/1 |
| 2009/0267540 | A1* | 10/2009 | Chemel ................. H05B 47/18 315/297 |
| 2009/0307176 | A1 | 12/2009 | Jeong et al. |
| 2012/0225534 | A1 | 9/2012 | Lee et al. |
| 2015/0056800 | A1 | 2/2015 | Mebarki et al. |
| 2015/0128156 | A1 | 5/2015 | Zhu et al. |
| 2015/0137061 | A1 | 5/2015 | Donghi et al. |
| 2015/0144859 | A1 | 5/2015 | Chen et al. |
| 2015/0243885 | A1 | 8/2015 | Sciarrillo |
| 2016/0360336 | A1 | 12/2016 | Gross et al. |
| 2017/0017776 | A1* | 1/2017 | Soulos ................... G09B 5/00 |
| 2017/0323062 | A1* | 11/2017 | Djajadiningrat .... G06F 16/3326 |
| 2018/0233011 | A1 | 8/2018 | Conti et al. |
| 2019/0201119 | A1 | 7/2019 | Harris et al. |
| 2019/0273854 | A1 | 9/2019 | Wexler et al. |
| 2019/0310716 | A1* | 10/2019 | Sinha .................... G06V 40/11 |
| 2019/0349728 | A1 | 11/2019 | Oppenheimer |
| 2020/0057487 | A1 | 2/2020 | Sicconi et al. |
| 2020/0175302 | A1 | 6/2020 | DeLuca et al. |
| 2020/0394436 | A1 | 12/2020 | Rakshit et al. |
| 2020/0409148 | A1* | 12/2020 | Alasaarela ........... G02B 6/0016 |

OTHER PUBLICATIONS

Anonymous, "Automatic Object Tracking," https://priorart.ip.com/IPCOM/000255187, IP.com No. IPCOM000255187D, Sep. 7, 2018, 23 pgs.

Anonymous, "System for Detecting and/or Locating Portable Objects Using Beacon Devices," https://priorart.ip.com/IPCOM/000255137, IP.com No. IPCOM000255137D, Sep. 4, 2018, 22 pgs.

Mell et al., "The NIST Definition of Cloud Computing," Recommendations of the National Institute of Standards and Technology, U.S. Department of Commerce, Special Publication 800-145, Sep. 2011, 7 pgs.

Stephens, D., "Using Missing Object Detection on your Security Camera," https://www.cctvcameraworld.com/using-missing-object-detection-on-security-camera/, Oct. 1, 2018, last accessed Jan. 29, 2021, 2 pgs.

Anonymous, "Method and Process for Determining if All Objects Have Been Loaded Into a Vehicle," https://priorart.ip.com/IPCOM/000247816, an IP.com Prior Art Database, IP.com No. IPCOM000247816D, Oct. 6, 2016, 2 pgs.

Anonymous, "System to Automatically Create a Carry on Objects—List Based on the Mobile Device Calendar Application," https://priorart.ip.com/IPCOM/000219428, an IP.com Prior Art Database, IP.com No. IPCOM000219428D, Jun. 290, 2012, 3 pgs.

Croes et al., "Interconnect metals beyond copper: reliability challenges and opportunities", https://www.researchgate.net/publication/330585273_Interconnect_metals_beyond_copper_reliability_challenges_and_opportunities, IEDM18-111-113, ©2018 IEEE, 4 pgs.

IBM: List of IBM Patents or Patent Applications Treated as Related. Filed Herewith. 2 pages.

* cited by examiner

| Gesture | Contextual Data Type | Identified Object |
|---|---|---|
| Head motions/eye movement directed downward toward couch | Activity history for watching TV at 8pm | Remote control |
| Head motions and arm movements directed toward car key rack | Calendar invite to a party | Car keys |
| Head motions and arm movements near kitchen drawer | Social Media post indicating the user is about to sing happy birthday | Lighter and/or matches |
| Head motions and arm movements near bar area | Internet search how to open a wine bottle | Wine bottle opener |

FIG. 3

AUTOMATED PREDICTION OF A LOCATION OF AN OBJECT USING MACHINE LEARNING

BACKGROUND

The present disclosure relates generally to the field of artificial intelligence, and more specifically to automatically predicting a location of an object using machine learning.

In many instances, a user may experience difficulty when trying to locate an object or item such as a television remote control, wallet, various utensils, and the like. For example, a user may forget where they have placed their car keys. To find the misplaced car keys, the user may spend significant time trying to locate the lost item, which can be an inconvenience for the user.

SUMMARY

Embodiments of the present disclosure include a method, computer program product, and system for predicting a location of an object using machine learning. A processor may monitor a data stream received from one or more observation devices. The processor may detect a gesture initiated by a user from the data stream, the gesture indicating that the user is searching for an object. The processor may identify the object by analyzing a set of contextual data associated with the user. The processor may predict, in response to identifying the object, a location of the object by analyzing historic data associated with the object from the data stream. The processor may output the predicted location of the object to the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3 illustrates an example object identification table, in accordance with embodiments of the present disclosure.

Figure 1:
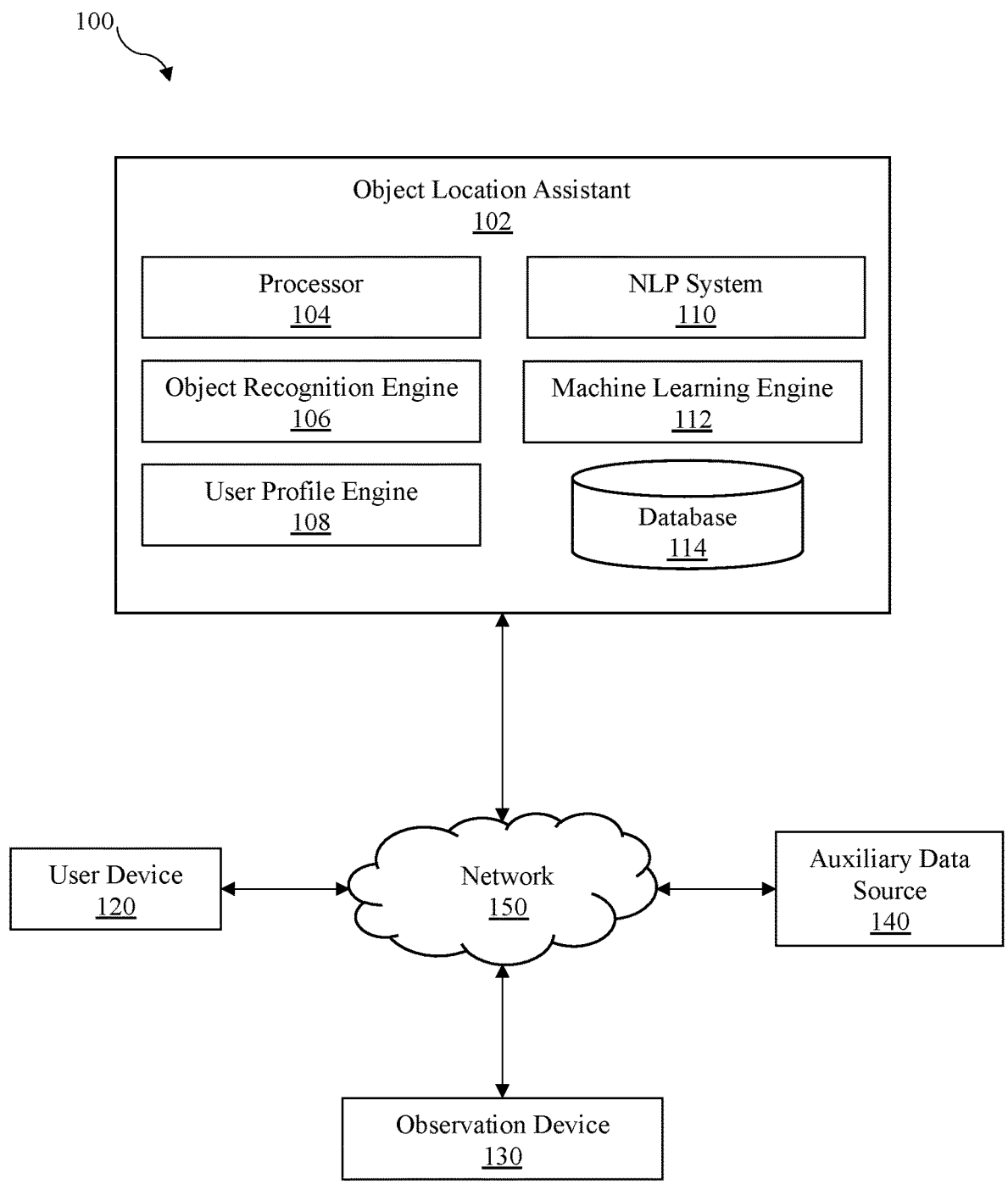
FIG. 1 illustrates a block diagram of an object location system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of artificial intelligence, and more particularly to automatically predicting a location of an object using machine learning. While the present disclosure is not necessarily limited to such applications, various aspects of the disclosure may be appreciated through a discussion of various examples using this context.

A user may experience difficulty when trying to locate an object that has been lost or misplaced. In many instances, performing a manual search for the lost object may take extra time to locate the object or result in not finding the object at all. With the advent of smart technologies such as smart homes, virtual assistants, and/or Internet of Things (IoT) network infrastructures, a user may leverage available data to help aid in their search for the missing object. For example, the user may review past footage from a smart camera to determine where the user last placed the object. However, manually performing such a tedious task would be time consuming for the user.

Embodiments of the present disclosure relate to a system, method, and computer program product that leverages smart technologies and machine learning to quickly predict the location of a lost object. In embodiments, the system may monitor a data stream from one or more observation devices. For example, the system may monitor a data stream from a smart camera (e.g., IoT camera) placed within an environment (e.g., living room, kitchen, factory, office building, etc.). From the data stream, the system may utilize image recognition to detect the presence of one or more objects within the environment and track the objects' various movements throughout the environment over a time period. For example, the system may track when a user is holding a specific object and where the object was last placed within the environment.

In embodiments, the system may further track the movements and gestures performed by the user to determine if the user is searching for a lost or misplaced object. The system may utilize machine learning and/or deep learning to perform a gesture analysis on the detected movements/gestures performed by the user. For example, the system may utilize a Region Based Convolution Neural Network (R-CNN) to train the system to recognize a set of gestures performed by the user that indicate the user is searching for an object (e.g., a lost, missing, or misplaced object). For example, using a set of training data (e.g., images of the user's various body movements that correlate to when the user is searching for various items, such as a television remote control, car keys, identification badges, and the like) the system may be trained to identify, based on the detected gesture, when the user is looking for a misplaced object. For example, the system may be trained to identify specific movements of body parts of the user, such as the neck, head, or eyes moving in various direction, or images of the user crouching down looking under a piece of furniture when searching for an item or object.

In embodiments, in response to detecting the user is looking for a misplaced object, the system may determine the type of object that the user is searching for by analyzing a set of contextual data associated with the user. The contextual data may be collected from various data sources such as the user's activity history related various objects, calendar information, text messages or communications, social media, internet search history, and/or IoT communications. Using the contextual data, the system correlates and predicts which object the user is likely searching for from a set of known objects. For example, the system may analyze the user's electronic calendar information using natural language processing (NLP) and identify that the user has an appointment in 15 mins that requires the use of a car to get there on time. The system may correlate this information with the gesture analysis of one or more gestures indicating the user is searching for an object near a car key rack where the car keys are typically hung.

Using the correlation, the system may determine that the user is searching for their car keys since they need to leave the house to make the appointment in time. In some embodiments, the system may further utilize NLP to analyze the user's speech to further aid the system in determining the object being searched for by the user. For example, while identifying the user is looking for something near the car key rack, the system may further analyze the user's speech and determine that the user has stated, "Where are my car keys?" or "I'm going to be late to my appointment." The system may utilize this information to further determine that the user is searching for their car keys.

In embodiments, the system may predict the likely location of the identified object by analyzing historic data associated with the placement and/or movement of the object obtained from the data stream of the observation device(s). The location of the identified object may be determined from mapping data of objects within the environment that is constantly updated over time to maintain current or predicted locations of all objects. For example, using image recognition, the system may identify from multiple data streams (e.g., data streams accessed over an IoT network/infrastructure) that the user's car keys were detected in the user's hand when entering the house by a first camera and later detected on an end table in the living room by a second camera.

In embodiments, the system will output the predicted location of the lost or missing object to the user via one or more different actions such as voice, text, and/or visual means. For example, the system may verbally indicate that the user's car keys are located in the living room on the end table. In another example, the system may utilize a visual indicator (e.g., an overlay of an arrow on Augmented Reality (AR) glasses or a smart contact lens, a beam of light via a smart premises infrastructure, and the like) to point the user to the predicted location of the object.

In embodiments, the system may automatically determine if the predicted location of the object was correct by continually analyzing the user's gestures and/or the presence of the lost or misplaced object. For example, if the user's current gestures indicate the user is still searching for a misplaced object that is not the same as the identified object, the system will continue analyzing the contextual data associated with the user and determine that the user is searching for a different or another potential object. In embodiments, the determination may be based on a confidence score generated for a list of known objects using the contextual data. For example, the system may identify the object with a highest confidence score as the probable missing object. If the system determines the user is still searching for a missing object that is not the identified object, the object with the next highest confidence score will be identified as the misplaced object, and so on, until the user finds the misplaced object.

In embodiments, the system may continuously learn and update a knowledgebase to account for changes in the user's behavioral patterns over time with respect to the various objects throughout the environment. Using machine learning techniques, the system may utilize the training observation data, the identified objects, and the contextual data over time to compare and correlate different data permutations in order to build usage patterns for each object and the user's behavior with respect to that object. For example, the system may identify various predicted locations of lost or misplaced objects based on previous instances of when and where the user has lost the given object. For example, the system may identify the predicted location of a television remote control as being wedged between couch cushions based on previously predicted locations of the remote control being found in the same spot even without image confirmation.

In some embodiments, the system may use a scoring model to provide scoring values to various objects that have been determined to be associated with each other to aid in determining the predicted location of a misplaced object. As more objects are observed together, the relationships between those objects will be given a higher score and the system will become more reliable in predicting which objects (e.g., missing objects, extra objects, etc.) may be found at a predicted location together on a given occasion. For example, the system may determine that a cake server has been found in three different locations over time within the environment that are associated with various objects, such as a kitchen drawer, dining room cabinet, and dishwasher. Based on the user's contextual data (e.g., the user is scheduled to have friends over for birthday cake in 5 mins), identification of the cake server as the misplaced object, and a gesture analysis of the user's gestures indicating the user is looking in the kitchen drawer, the system can quickly identify other probable locations of the cake server if it is not found in the kitchen drawer based on scores given to the associated objects where the cake server has been found previously (assuming a lack of image recognition data for the actual location of the cake server).

In some embodiments, the user(s) must opt into the system in order for the system to collect their information (e.g., observation data, contextual data, social media data, etc.), and the user may determine which other users (e.g., third party alerts/notifications through smartphone/smart speaker, second users, etc.) can output alerts to the user based on the collected data. For example, during an initialization process, the system may inform the user of the types of data that it will collect (e.g., image data of the user and respective objects, etc.) and the reasons why the data is being collected. In these embodiments, the system will only start collecting the user information upon the user explicitly permitting the collection. Furthermore, the system may only collect the data that is necessary to provide notification to the user regarding predicted locations of various objects. The data may be anonymized and/or encrypted while in use, and the data may only be maintained as needed for providing necessary actions. If the user chooses to opt out of the system, any user information previously collected may be permanently deleted.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of object location system 100, in accordance with embodiments of the present disclosure. In the illustrated embodiment, object detection system 100 includes object location assistant 102 that is communicatively coupled to user device 120, observation device 130, and auxiliary data source 140 via network 150. Object location assistant 102, user device 120, and observation device 130 may be any type of computer system and may be substantially similar to computer system 1101 of FIG. 5. In embodiments, object location assistant 102 may a standalone device (e.g., having its own user interface, audio output for alerts, etc.) or a virtualized application located on another computer system, such as a server accessible by user device 120. For example, object location assistant 102 may be a virtual application accessed by user device 120 through a cloud computing network, such as cloud computing environment 50 described in FIG. 6.

In some embodiments, object location assistant 102 may be configured as or communicatively coupled to any one of any number of software agents capable of interacting with a user by means of text or audible speech and providing information or performing tasks based on the voice or text input of the user. Examples may include recent commercially successful voice-based virtual assistants such as the Google Home® (Google Home® and all Google Home®-based trademarks and logos are trademarks or registered trademarks of Google Inc. and/or its affiliates), the Amazon Echo® (Amazon Echo® and all Amazon Echo®-based trademarks and logos are trademarks or registered trademarks of Amazon Technologies, Inc. and/or its affiliates), and Siri® (Siri® and all Siri®-based trademarks and logos are trademarks or registered trademarks of Apple Inc. and/or its affiliates). However, it is noted that this list is not meant to be limiting.

User device 120 may be any type of device (e.g., smart phone, smart speaker, smart vehicle, etc.) configured to communicate with and/or receive a notification from object location assistant 102. For example, user device 120 may be a smart phone that receives a notification from object location assistant 102 that identifies the predicted location of a lost or misplaced object. In embodiments, object location assistant 102 may collect contextual data from user device 120 to learn about the user with respect to various known objects. For example, object location assistant 102 may collect various behavioral information related to the user (e.g., through calendar information, text messages, etc.) such as scheduled events and correlate those events with respect to misplaced objects. For example, the user may have a golf outing scheduled on their calendar and the system may observe the user dressed in golf attire searching for something in storage room. This contextual data may be correlated to the location of a set of golf clubs located in the user's garage rather than the storage room.

Observation device 130 may be any type of device (e.g., IoT camera, sensor, smart home equipped with a set of cameras, smart speaker, etc.) that generates observation data related to the user. For example, observation device 130 may be a set of cameras that generate image data of a user searching for one or more objects on a given occasion. The observation data generated by observation device 130 may include various forms of contextual data (e.g., metadata) used by the object location assistant 102 to gain information about the user and one or more identified objects. For example, observation data may include contextual data indicating when identified objects were last observed with the user (e.g., day, date, time, etc.) and where the user last placed the objects.

Auxiliary data source 140 may be any type of contextual data source (e.g., social media website, email account, cloud calendar information, messaging service, etc.) used by the object location assistant 102 to determine user patterns related to the user and one or more identified objects. For example, the auxiliary data source 140 may be a social networking website where the object location assistant 102 gathers information about what the user is doing on a given occasion (e.g., through a social media post by the user stating, "Anyone want to come to my birthday party this weekend?"). In another example, the auxiliary data source 140 may be a cloud-based calendar where the object location assistant 102 gathers information about the user by analyzing the user's schedule and makes connections between various objects associated with the user. In embodiments, information gathered from auxiliary data source 140 may be analyzed by the object location assistant 102 using natural language processing (NLP) system 110.

Network 150 may be any type of communication network, such as a wireless network or a cloud computing network. Network 150 may be substantially similar to, or the same as, cloud computing environment 50 described in FIG. 6. In embodiments, network 150 can be implemented using any number of any suitable communications media. For example, the network may be a wide area network (WAN), a local area network (LAN), a personal area network (PAN), an internet, or an intranet. In certain embodiments, the various systems may be local to each other, and communicate via any appropriate local communication medium.

For example, object location assistant 102 may communicate with user device 120, observation device 130, and auxiliary data source 140 using a WAN, one or more hardwire connections (e.g., an Ethernet cable) and/or wireless communication networks. In some embodiments, the various systems may be communicatively coupled using a combination of one or more networks and/or one or more local connections. For example, object location assistant 102 may communicate with observation device 130 using a hardwired connection, while communication between user device 120, auxiliary data source 140, and object location assistant 102 may be through a wireless communication network.

In the illustrated embodiment, object location assistant 102 includes processor 104, object recognition engine 106, user profile engine 108, NLP system 110, machine learning engine 112, and database 114.

In embodiments, object recognition engine 106 is configured to monitor, detect, and/or identify one or more objects from a data stream received from observation device 130 placed within the environment. Further the object recognition engine 106 is configured to monitor, detect, and/or identify one or more gestures associated with a user from the data stream. For example, object recognition engine 106 may include image recognition algorithms used to identify various gestures performed by the user from image data collected from an IoT camera.

In embodiments, user profile engine 108 is configured to generate a user profile associated with the user. The user profile may include user specific training data (e.g., images, gestures, movements) that is utilized by machine learning engine 112 to train the system to recognize various gestures performed by the user that indicate the user is searching for a lost or misplaced object. The user profile may contain and/or track user patterns/usage pattern with respect to various objects and placement of those object throughout a given environment. The user profile may be stored on database 114 of object location assistant 102 and/or user device 120. The user profile may utilize a central registration identifier to manage all user devices 120 owned by the user such that they may be associated with object location assistant 102. The user profile may include various social identifiers (e.g., email, social media account names, contact information) that allow object location assistant 102 to collect contextual data about the user from auxiliary data source 140. Further, the social identifiers included in the user profile may allow object location assistant 102 to automatically output various alerts (e.g., text, voice, or visual alert indicating the predicted location of the missing object) to the user through associated user device 120. For example, object location assistant 102 may output an arrow to a set of augmented reality glasses that point the user to the predicted location of the lost or misplaced object.

In embodiments, NLP system 110 may collect, monitor, and/or analyze contextual data (e.g., calendar data, social media posts, comments, spoken content, unstructured data, etc.) from user device 120, observation device 130, and/or auxiliary data source 140 to determine behavioral patterns and/or trends related to the identified object(s). For example, NLP system 110 may analyze timestamps and/or location information from image data collected from observation device 130, calendar entries collected from user device 120, and social media posts collected from auxiliary source 140 to determine a usage/placement/movement patterns related to a misplaced object. In embodiments, NLP system 110 may be substantially similar to the natural language processing system 412 of FIG. 4.

In embodiments, machine learning engine 112 may utilize machine learning and/or deep learning to perform a gesture analysis on the detected movements/gestures performed by the user from the data stream received from the observation device. For example, the system may utilize a Region Based Convolution Neural Network (R-CNN) to train the system to recognize a set of gestures performed by the user that indicate the user is searching for an object (e.g., a lost object). For example, using a set of training data (e.g., images of the user's various body movements that correlate to when the user is searching for various items, such as a television remote control, car keys, identification badges, and the like) the system may be trained to identify, based on the detected gesture, when the user is looking for a misplaced object. For example, the system may be trained to identify specific movements of body parts of the user, such as the neck, head, or eyes moving in various direction, or images of the user crouching down looking under a piece of furniture when searching for an item or object.

In embodiments, machine learning engine 112 may collect, monitor, and/or analyze data (e.g., observation data and/or contextual data) received from user device 120, observation device 130, and/or auxiliary data source 140 to determine usage patterns of the user with respect to the misplaced or lost objects. In embodiments, machine learning engine 112 can utilize machine learning and/or deep learning, where algorithms or models can be generated by performing supervised, unsupervised, or semi-supervised training on historical observation data and/or historical contextual data in conjunction with user input to correlate the accuracy of outputting various alerts in order to properly alert the user when forgetting and/or carrying additional objects.

For example, machine learning engine 112 may utilize logical regression, decision tree classification, or support vector machine-based classification to determine which predicted locations of the misplaced object(s) were correct (e.g., detecting via gesture analysis and image recognition that the misplace object has been found or not found) and/or which predictions were erroneous (e.g., the user was not looking for a misplaced object). Using this information, machine learning engine 112 can analyze the results to improve the accuracy of predicting the probable location and/or reducing the inaccuracy of alerting the user. For example, the machine learning engine 112 over time may determine certain gestures do not indicate the user is looking for an object that were previously classified as such. In this way, object location assistant 102 may continuously improve the accuracy of appropriately helping the user locate a missing object.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of the object location assistant system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the automated object location assistant system 100 may not be present, and the arrangement of components may vary.

For example, while FIG. 1 illustrates an example object location system 100 having an object location assistant 102, a single user device 120, a single observation device 130, and a single auxiliary data source 140, suitable network architectures for implementing embodiments of this disclosure may include any number of object location assistants, user devices, observation devices, and auxiliary data sources. The various models, modules, systems, and components illustrated in FIG. 1 may exist, if at all, across a plurality of object location assistants, user devices, observation devices, and auxiliary data sources.

Figure 2:
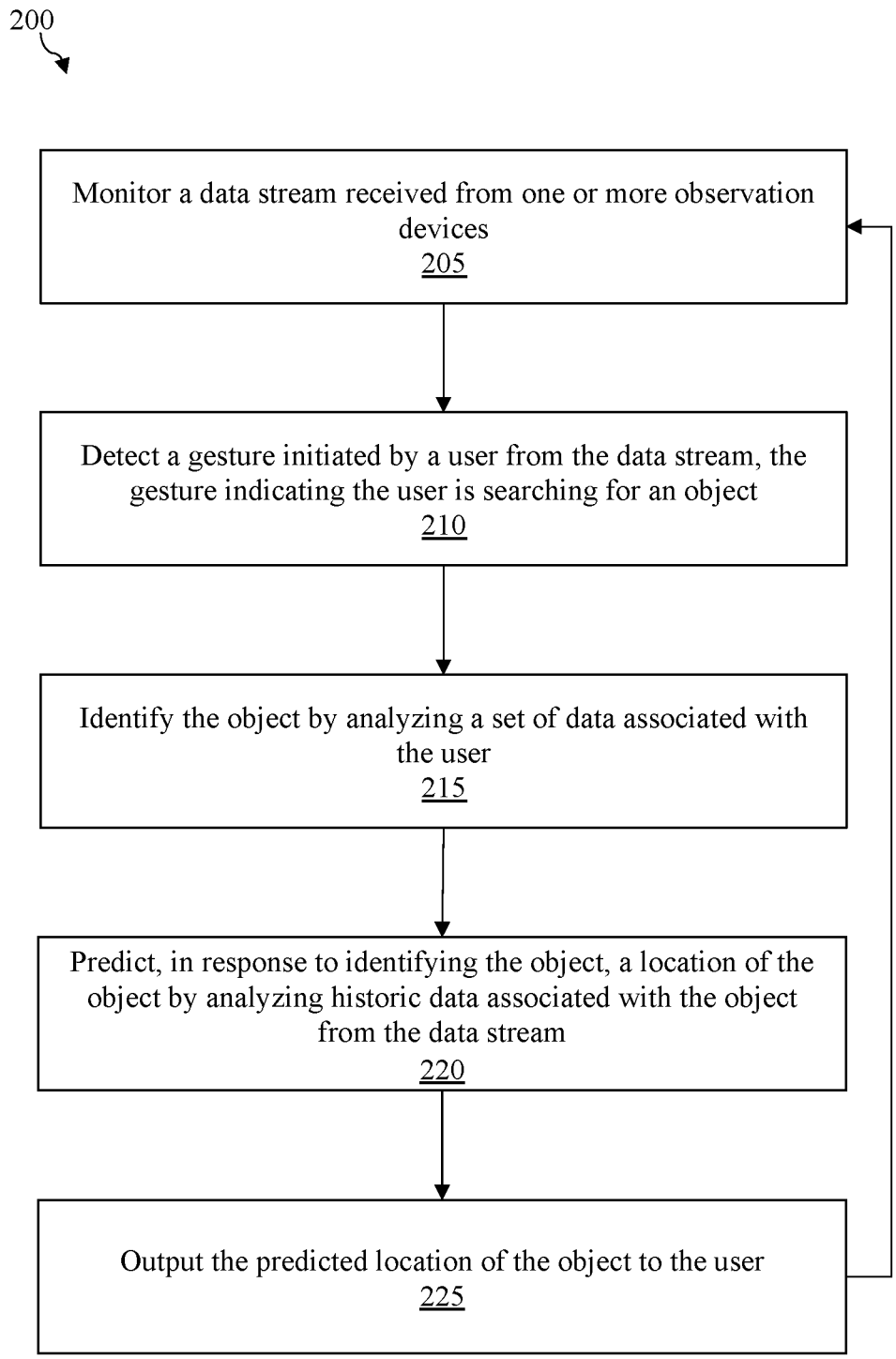
FIG. 2 illustrates a flow diagram of an example process for predicting a location of an object, in accordance with embodiments of the present disclosure.

Referring now to FIG. 2, shown is a flow diagram of an example process 200 for predicting a location of an object, in accordance with embodiments of the present disclosure. The process 200 may be performed by processing logic that comprises hardware (e.g., circuitry, dedicated logic, programmable logic, microcode, etc.), software (e.g., instructions run on a processor), firmware, or a combination thereof. In some embodiments, the process 200 is a computer-implemented process. The process 200 may be performed by processor 104 exemplified in FIG. 1.

The process 200 begins by monitoring a data stream received from one or more observation devices. This is illustrated at step 205. For example, an object location assistant (e.g., object location assistant 102 of FIG. 1) may monitor the data stream received from one or more IoT cameras disposed in an environment. In some embodiments, the data stream may comprise of multiple data streams received from multiple observation devices disposed in an environment (e.g., IoT cameras throughout different rooms of a home, business, structure, etc.) to allow the object location assistant to track various movements of both a user(s) and various objects throughout the environment.

The process 200 continues by detecting a gesture initiated by a user from the data stream, wherein the gesture indicates that the user is searching for an object (misplaced, missing, or lost object). This is illustrated at step 210. In embodiments, the object location assistant may analyze the data stream using image recognition algorithms to detect the user has performed a gesture. The object location assistant may be trained using a machine learning model, such as a Region Based Convolution Neural Network. The identified gesture may be compared to a set of training data comprising a plurality of known gestures performed by the user during a training period. The object location assistant may perform a gesture analysis using machine learning that identifies if the gesture indicates the user is searching for a misplaced object. For example, the object location assistant may detect that the user is searching (based on various body movements) for an object near a desk where the user typically keeps their mail.

The process 200 continues by identifying the object by analyzing a set of contextual data associated with the user. This is illustrated at step 215. In embodiments, the contextual data may be any type of data (e.g., timestamp data, user activity history data with respect to various objects, calendar data, textual data related to the user, location data, metadata, and the like) used to identify the misplaced object the user is searching for. For example, the object location assistant may analyze a text message sent from a second user indicating that the second user will be coming over to pick up a package in 10 mins. Using the contextual data from the text message, the object location assistant may determine that the user is searching for the package to give to the second user.

In embodiments, the object location assistant may determine the specific object the user is looking for from a set of known objects based on the contextual data associated with the user. Returning to the previous example, the user may have multiple packages located in the environment (e.g., laying on or near the desk, located in a different room in the house, etc.) that could be the package referred to by the second user in the text message. The object location assistant may calculate a score (e.g., confidence score) for each of the set of known objects, where the score indicates a likelihood that a given object is the object that the user is searching for. The object location assistant will identify the object having the highest score as the object the user is looking for.

For example, using image recognition, the object location assistant may identify 3 possible packages, where a first package located in another room distant from the desk includes the second user's name printed on it, while the other two packages may be located on the desk with no name markings. Because the first package includes the second user's name it will be provided the highest score of the 3 packages, thus the object location assistant will identify the first package as the object the user is searching for.

The process 200 continues by predicting, in response to identifying the object, a location of the object by analyzing historic data associated with the object from the data stream. This is illustrated at step 220. In embodiments, the system learns to identify the location of a misplaced or lost object based on where it was last seen or placed. This may be done by mapping the last location of each known object in the environment. Returning to the previous example, the object location assistant may use the mapping (e.g., a mapping table) to find the last location of the first package, which was indicated to be in another room distant from where the user was searching. In some embodiments, once the predicted location has been determined, the object location assistant may confirm the predicated location by analyzing the current data stream located in that same area.

The process 200 continues by outputting the predicted location of the object to the user. This is illustrated at step 225. The object location assistant may notify or alert the user of the predicted location of the object using any type of notification action. For example, the object location assistant may activate a visual indicator to physically identify the predicted location of the object, such as using an arrow augmented reality device, or a beam of light directed at the predicted location of the object. For example, the object location assistant may utilize a smart home infrastructure equipped with a series of lights or beams to direct the user to the object.

In another example, the object location assistant may notify the user of the predicted location by sending a textual communication to a user device, wherein the textual communication indicates the predicted location of the object. In another example, the object location assistant may provide an audio message to verbally indicate the predicted location of the object (e.g., verbally tell the user that the package is in another room).

In embodiments, the process 200 may return to step 205 if the user has not found the object at the predicted location or if the object location assistant has identified the wrong object that the user is searching for. This may be done intuitively by the object location assistant by receiving a second gesture from the user indicating that the user is searching for a second object that is different than the identified object (e.g., hand waving indicating it's not the right object or location, or through a verbal indication). In response, the object location assistant may identify the second object based on the set of data associated with the user (e.g., next highest confidence score). In this way, the system will continue to aid the user in locating the misplaced object until it is found.

Referring now to FIG. 3, shown is an example object identification table 300, in accordance with embodiments of the present disclosure. In the illustrated embodiment, the object identification table 300 includes a set of columns indicating detected gesture 302, contextual data type 304, and identified object 306 for a set of example observation instances. For example, the first observation instance indicates that the object location assistant (e.g., object location assistant 102 of FIG. 1) has detected gestures 302 associated with head motions and eye movement directed downward toward the user's couch. Correlating the detected gestures 302 and the contextual data type 304 indicating user activity history for typically watching television at 8 pm (which assumes is the current time based on metadata), the object location assistant determines that the user is likely searching for the television's remote control. Once identified, the object location assistant may direct the user (e.g., verbally, visually, textually) to where a predicted location of the identified object 306 would most likely be found based on historic movement data of the remote control collected from the observation device's data stream.

Further types of observation instances are included in the table 300. It is noted that object identification table 300 is only used as an example and is not meant to be limiting. In embodiments, the number of observations instances, gestures, contextual data types, and/or identified objects may be increased or decreased depending on the design of the training model for recognizing various gestures and objects.

Figure 4:
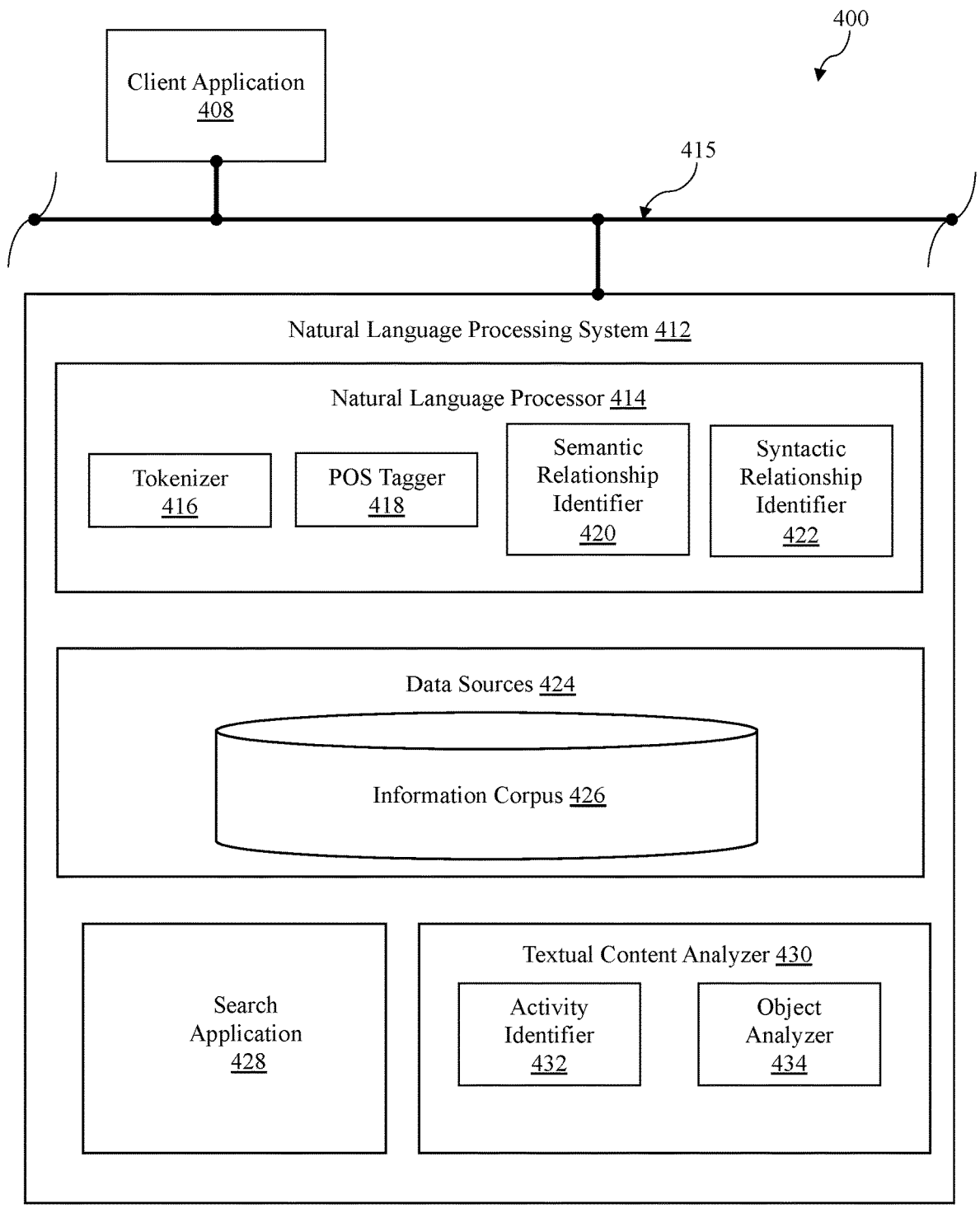
FIG. 4 illustrates a block diagram of an example natural language processing system configured to analyze contextual data associated with a user, in accordance with embodiments of the present disclosure.

Referring now to FIG. 4, shown is a block diagram of an example natural language processing system 400 configured to analyze contextual data associated with a user, in accordance with embodiments of the present disclosure. In embodiments, an object location assistant (such as object location assistant 102 of FIG. 1) may collect contextual data (e.g., unstructured data, text messages, spoken content, etc.) and send it in the form of unstructured textual documents/transcripts to be analyzed by the natural language system 400 which may be a standalone device, or part of a larger computer system. Such a natural language system 400 may include a client application 408, which may itself involve one or more entities operable to generate or modify information in the unstructured textual document(s) (e.g., analog or electronic textual content artifacts) that is then dispatched to a natural language processing system 412 via a network 415.

Consistent with various embodiments, the natural language processing system 412 may respond to the unstructured textual documents/transcripts sent by a client application 408. Specifically, the natural language processing system 412 may analyze a received unstructured textual document (e.g., calendar entries, text messages, spoken content, etc.) to identify one or more terms associated with sentiment and emotion. In some embodiments, the natural language processing system 412 may include a natural language processor 414, data sources 424, a search application 428, and a textual content analyzer 430. The natural language processor 414 may be a computer module that analyzes the received unstructured textual documents/transcripts. The natural language processor 414 may perform various methods and techniques for analyzing electronic documents (e.g., syntactic analysis, semantic analysis, emotional analysis, etc.). The natural language processor 414 may be configured to recognize and analyze any number of natural languages. In some embodiments, the natural language processor 414 may parse passages of the documents. Further, the natural language processor 414 may include various modules to perform analyses of the unstructured textual documents/transcripts. These modules may include, but are not limited to, a tokenizer 416, a part-of-speech (POS) tagger 418, a semantic relationship identifier 420, and a syntactic relationship identifier 422.

In some embodiments, the tokenizer 416 may be a computer module that performs lexical analysis. The tokenizer 416 may convert a sequence of characters into a sequence of tokens. A token may be a string of characters included in the unstructured textual documents/transcripts and categorized as a meaningful symbol. Further, in some embodiments, the tokenizer 416 may identify word boundaries in the unstructured textual documents/transcripts and break any text passages within the document into their component text elements, such as words, multiword tokens, numbers, and punctuation marks. In some embodiments, the tokenizer 416 may receive a string of characters, identify the lexemes in the string, and categorize them into tokens.

Consistent with various embodiments, the POS tagger 418 may be a computer module that marks up a word in passages (e.g., unstructured textual documents/transcripts) to correspond to a particular part of speech. The POS tagger 418 may read a passage or other text in natural language and assign a part of speech to each word or other token. The POS tagger 418 may determine the part of speech to which a word (or other text element) corresponds, based on the definition of the word and the context of the word. The context of a word may be based on its relationship with adjacent and related words in a phrase, sentence, or paragraph. In some embodiments, the context of a word may be dependent on one or more previously analyzed electronic documents. In embodiments, the output of the natural language processing system 412 may populate a text index, a triplestore, or a relational database to enhance the contextual interpretation of a word or term. Examples of parts of speech that may be assigned to words include, but are not limited to, nouns, verbs, adjectives, adverbs, and the like. Examples of other part of speech categories that POS tagger 418 may assign include, but are not limited to, comparative or superlative adverbs, wh-adverbs, conjunctions, determiners, negative particles, possessive markers, prepositions, wh-pronouns, and the like. In some embodiments, the POS tagger 418 may tag or otherwise annotate tokens of a passage with part of speech categories. In some embodiments, the POS tagger 418 may tag tokens or words of a passage to be parsed by the natural language processing system 412.

In some embodiments, the semantic relationship identifier 420 may be a computer module that may be configured to identify semantic relationships of recognized text elements (e.g., words, phrases) in documents. In some embodiments, the semantic relationship identifier 420 may determine functional dependencies between entities and other semantic relationships.

Consistent with various embodiments, the syntactic relationship identifier 422 may be a computer module that may be configured to identify syntactic relationships in a passage composed of tokens. The syntactic relationship identifier 422 may determine the grammatical structure of sentences such as, for example, which groups of words are associated as phrases and which word is the subject or object of a verb. The syntactic relationship identifier 422 may conform to formal grammar.

In some embodiments, the natural language processor 414 may be a computer module that may parse a document and generate corresponding data structures for one or more portions of the unstructured textual documents/transcripts. For example, in response to receiving an unstructured textual report at the natural language processing system 412, the natural language processor 414 may output parsed text elements from the report as data structures. In some embodiments, a parsed text element may be represented in the form of a parse tree or other graph structure. To generate the parsed text element, the natural language processor 414 may trigger computer modules 416-422.

In some embodiments, the output of natural language processor 414 may be used by search application 428 to extract contextual information from data source 424 (e.g., a user's calendar, social media, social activity, communication data, etc.). As used herein, a corpus may refer to one or more data sources. In some embodiments, the data sources 424 may include data warehouses, information corpora, data models, and document repositories. In some embodiments, the data sources 424 may include an information corpus 426. The information corpus 426 may enable data storage and retrieval. In some embodiments, the information corpus 426 may be a storage mechanism that houses a standardized, consistent, clean, and integrated list of contextual data regarding the user's day to day activity related to one or more objects. Data stored in the information corpus 426 may be structured in a way to specifically address reporting and analytic requirements. In some embodiments, the information corpus 426 may be a data repository, a relational database, triplestore, or text index.

In some embodiments, the textual content analyzer 430 may be a computer module that identifies user activity related to one or more objects within textual content. In some embodiments, the textual content analyzer 430 may include an activity identifier 432 and an object analyzer 434. The activity identifier 432 may be configured to identify or determine various activities that require the user of specific objects. The object analyze 434 may determine the specific object corresponding to the activity. For example, when an unstructured textual document (e.g., text messages related to an activity, calendar data, etc.) is received by the natural language processing system 412, the textual content analyzer 430 may be configured to analyze the document using natural language processing to identify an activity related to using, carrying, placing, moving, or associating with one or more objects.

Figure 5:
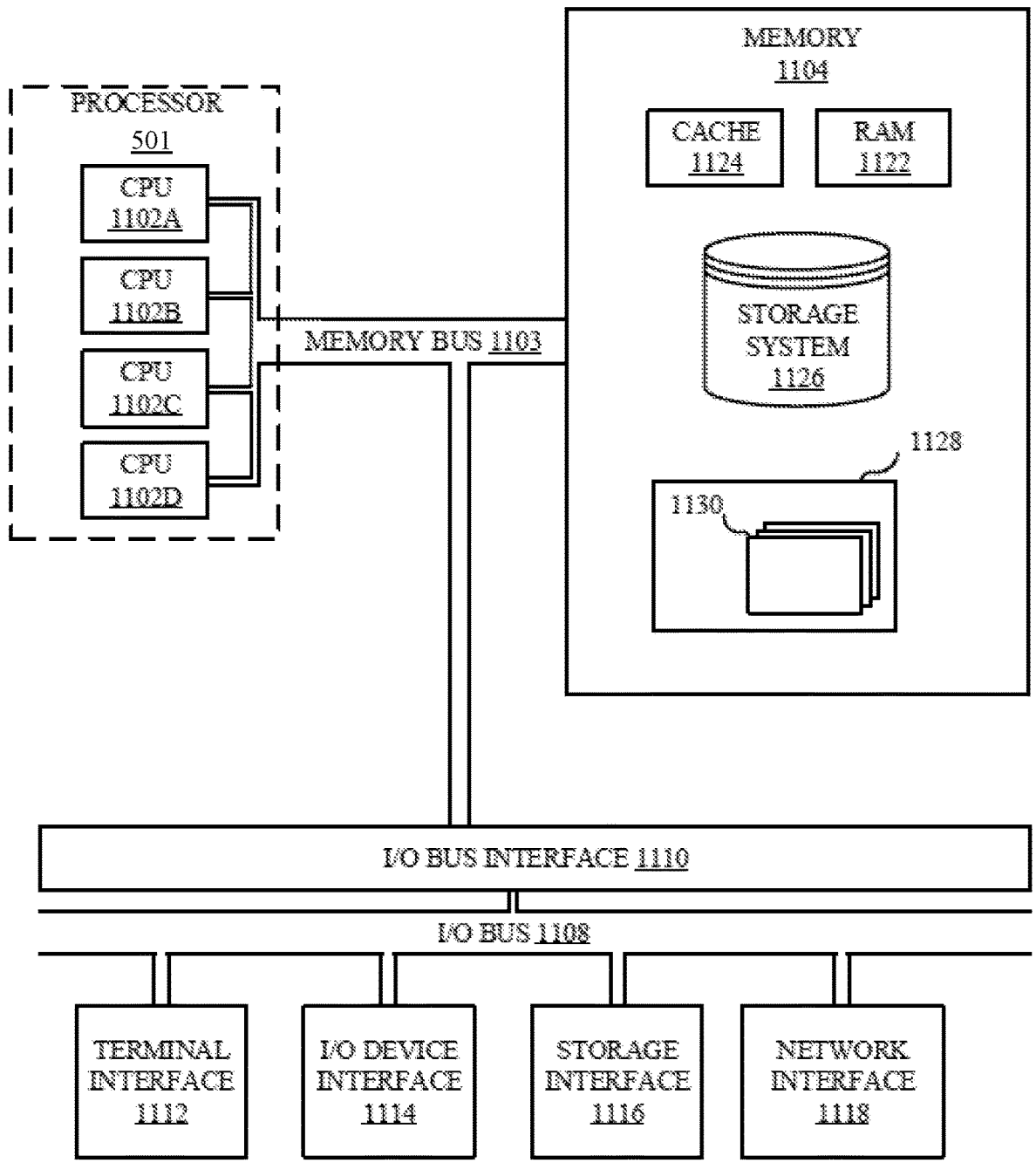
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200).

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 5 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 1101. In some embodiments, however, individual components may have greater or lesser complexity than as represented in FIG. 5, components other than or in addition to those shown in FIG. 5 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
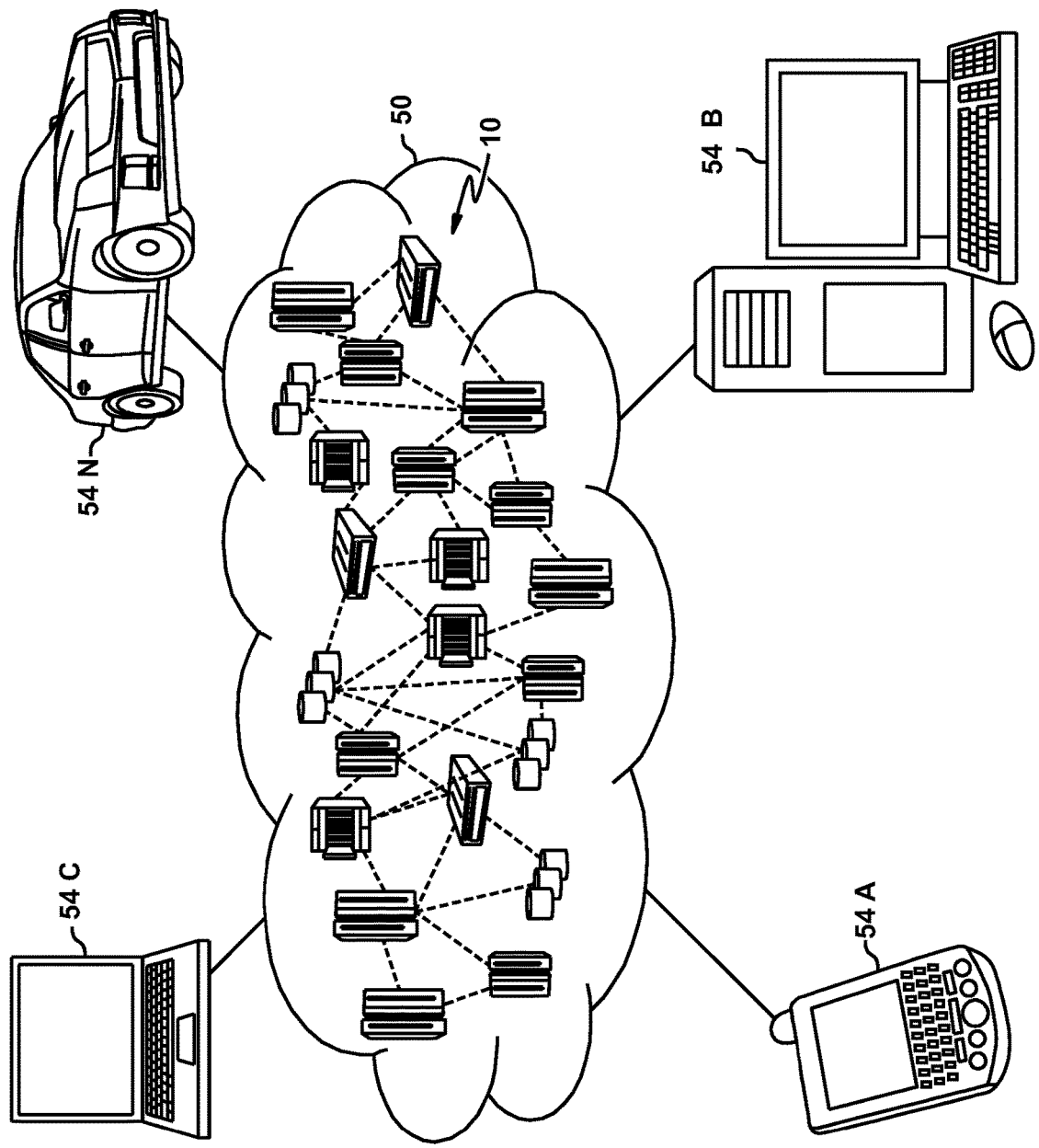
FIG. 6 depicts a cloud computing environment in accordance with embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
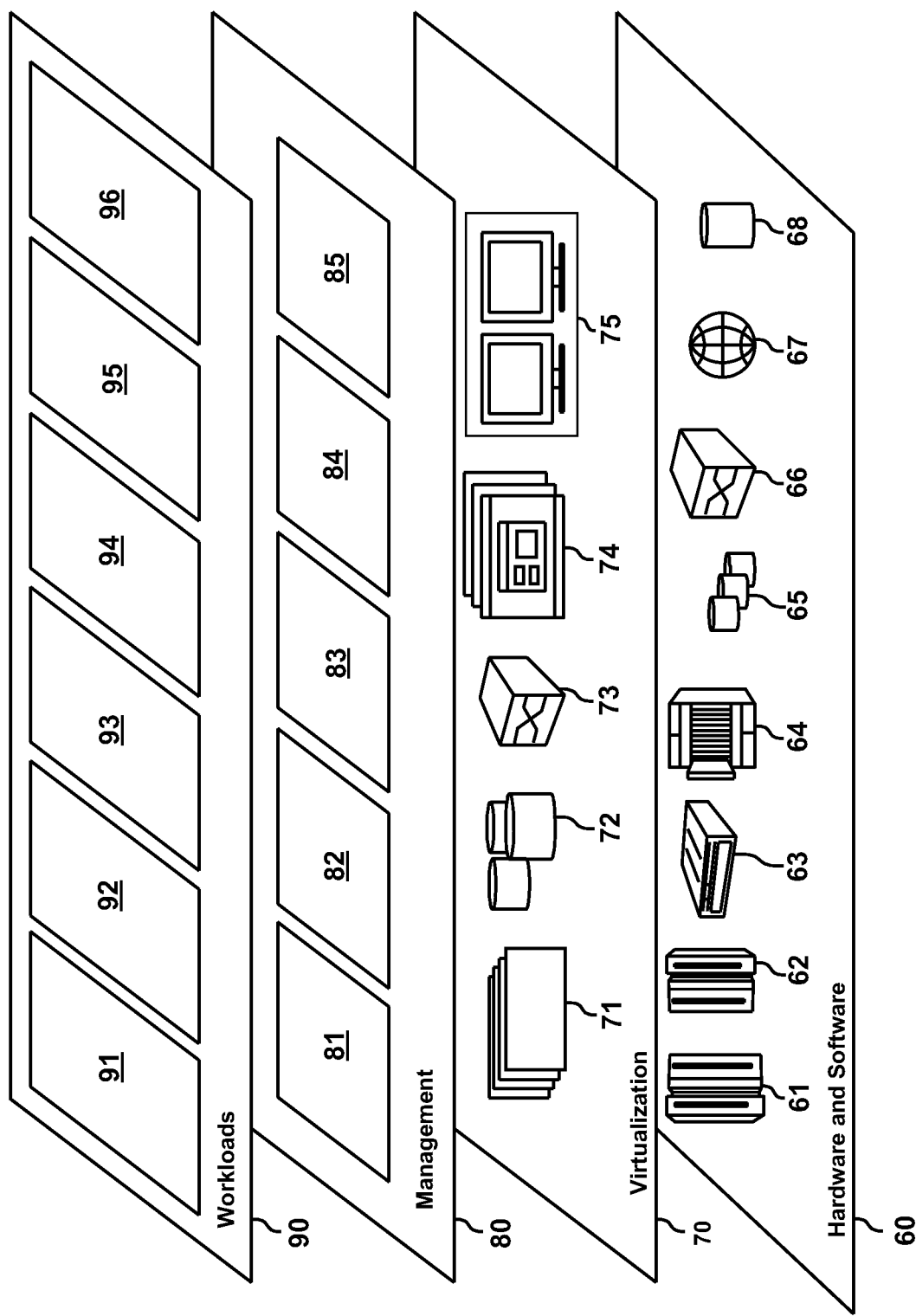
FIG. 7 depicts abstraction model layers in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and object location assistant software 68 in relation to the object location assistant 102 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object location determination 96. For example, object location assistant 102 of FIG. 1 may utilize workload layer 90 to make determinations and/or predictions of the locations of various objects throughout an environment.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., $100a$, $100b$, $100c$) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
analyzing, using a machine learning model, a set of training data related to a plurality of body gestures performed by a user;
determining, using the machine learning model and based on the set of training data, a subset of body gestures that are associated with user movement indicating that the user is searching for one or more objects;
monitoring a data stream received from one or more observation devices;
detecting a body gesture initiated by the user from the data stream;
performing, using the machine learning model, a gesture analysis on the body gesture;
determining, based on the gesture analysis, that the body gesture indicates that the user is searching for an object;
identifying the object by analyzing a set of contextual data associated with the user, wherein the set of contextual data is at least one data type selected from the group of data types consisting of calendar data, text message communication data, and social media data, and wherein the set of contextual data comprises unstructured textual data related to performing an activity with the object;
predicting, in response to identifying the object, a location of the object by analyzing historic data associated with the object from the data stream; and
outputting the predicted location of the object to the user, in part, by activating a beam of light to physically identify the predicted location of the object.

2. The computer-implemented method of claim 1, wherein outputting the predicted location of the object to the user further comprises at least one action selected from the group of actions consisting of:
providing an audio message to verbally indicate the predicted location of the object;
and
sending a textual communication to a user device, wherein the textual communication indicates the predicted location of the object.

3. The computer-implemented method of claim 1, wherein the identifying the object by analyzing the set of contextual data associated with the user comprises:
determining a set of objects based in part on the set of contextual data associated with the user;
calculating a score for each of the set of objects, wherein the score indicates a likelihood that a given object is the object that the user is searching for; and
identifying the object based on the calculated score for each of the set of objects.

4. The computer-implemented method of claim 3, wherein the object is a first object of the set of objects having a highest score.

5. The computer-implemented method of claim 1, wherein the machine learning model is a convolution neural network.

6. The computer-implemented method of claim 1, wherein the set of contextual data associated with the user is analyzed using natural language processing.

7. The computer-implemented method of claim 1, further comprising:
receiving a second body gesture from the user indicating that the user is searching for a second object that is different than the identified object; and
identifying the second object based on the set of contextual data associated with the user.

8. A system comprising:
a processor; and
a computer-readable storage medium communicatively coupled to the processor and storing program instructions which, when executed by the processor, cause the processor to perform a method comprising:
analyzing, using a machine learning model, a set of training data related to a plurality of body gestures performed by a user;
determining, using the machine learning model and based on the set of training data, a subset of body gestures that are associated with user movement indicating that the user is searching for one or more objects;
monitoring a data stream received from one or more observation devices;
detecting a body gesture initiated by the user from the data stream;
performing, using the machine learning model, a gesture analysis on the body gesture;
determining, based on the gesture analysis, that the body gesture indicates that the user is searching for an object;
identifying the object by analyzing a set of contextual data associated with the user, wherein the set of contextual data is at least one data type selected from the group of data types consisting of calendar data, text message communication data, and social media data, and wherein the set of contextual data comprises unstructured textual data related to performing an activity with the object;
predicting, in response to identifying the object, a location of the object by analyzing historic data associated with the object from the data stream; and
outputting the predicted location of the object to the user, in part, by activating a beam of light to physically identify the predicted location of the object.

9. The system of claim 8, wherein outputting the predicted location of the object to the user further comprises at least one action selected from the group of actions consisting of:
providing an audio message to verbally indicate the predicted location of the object;
and
sending a textual communication to a user device, wherein the textual communication indicates the predicted location of the object.

10. A computer program product comprising a computer-readable storage medium having program instructions embodied therewith, the program instructions executable by a processor to cause the processor to perform a method comprising:
analyzing, using a machine learning model, a set of training data related to a plurality of body gestures performed by a user;
determining, using the machine learning model and based on the set of training data, a subset of body gestures that are associated with user movement indicating that the user is searching for one or more objects;
monitoring a data stream received from one or more observation devices;
detecting a body gesture initiated by the user from the data stream;
performing, using the machine learning model, a gesture analysis on the body gesture;

determining, based on the gesture analysis, that the body gesture indicates that the user is searching for an object;

identifying the object by analyzing a set of contextual data associated with the user, wherein the set of contextual data is at least one data type selected from the group of data types consisting of calendar data, text message communication data, and social media data, and wherein the set of contextual data comprises unstructured textual data related to performing an activity with the object;

predicting, in response to identifying the object, a location of the object by analyzing historic data associated with the object from the data stream; and outputting the predicted location of the object to the user, in part, by activating a beam of light to physically identify the predicted location of the object.

11. The computer program product of claim 10, wherein outputting the predicted location of the object to the user further comprises at least one action selected from the group of actions consisting of:

providing an audio message to verbally indicate the predicted location of the object;

and sending a textual communication to a user device, wherein the textual communication indicates the predicted location of the object.

12. The computer program product of claim 10, wherein outputting the predicted location of the object to the user further comprises activating a visual indicator to physically identify the predicted location of the object, wherein the visual indicator is displayed on an augmented reality device.

13. The computer-implemented method of claim 1, wherein the plurality of body gestures comprise movements of a neck, head, and eyes in one or more directions.

14. The computer-implemented method of claim 1, wherein the beam of light is projected from a smart premises infrastructure.

15. The computer-implemented method of claim 14, wherein the beam of light projected from the smart premises infrastructure comprises a series of lights used to direct the user to the object.

* * * * *